United States Patent [19]

Botha et al.

[11] Patent Number: 4,498,856

[45] Date of Patent: Feb. 12, 1985

[54] COMPACTING MILL

[75] Inventors: Charles F. Botha; Adriaanus L. Lambrechts, both of Malmesbury, South Africa

[73] Assignee: Ru-Korrel (Propietary) Limited, South Africa

[21] Appl. No.: 548,507

[22] Filed: Nov. 3, 1983

[30] Foreign Application Priority Data

Nov. 5, 1982 [ZA] South Africa ........................ 82/8148

[51] Int. Cl.[3] .............................................. B29F 3/012

[52] U.S. Cl. .................................... 425/331; 425/314; 425/DIG. 230

[58] Field of Search ............. 425/314, 331, DIG. 230, 425/382 R

[56] References Cited

U.S. PATENT DOCUMENTS

| | | | |
|---|---|---|---|
| 2,782,736 | 2/1957 | Johnson | 425/DIG. 230 |
| 3,207,091 | 9/1965 | Cunningham | 425/331 |
| 3,232,245 | 2/1966 | Lawrence et al. | 425/331 |
| 3,307,501 | 3/1967 | Wenger | 425/331 |
| 3,679,343 | 7/1972 | Gilman | 425/331 |
| 3,758,563 | 9/1973 | Uematsu et al. | 425/331 |

FOREIGN PATENT DOCUMENTS

| | | | |
|---|---|---|---|
| 1900721 | 9/1969 | Fed. Rep. of Germany | 425/331 |
| 317272 | 8/1929 | United Kingdom . | |
| 884005 | 12/1961 | United Kingdom . | |
| 1240367 | 7/1971 | United Kingdom . | |

*Primary Examiner*—Jay H. Woo
*Assistant Examiner*—Tinker R. McBrayer
*Attorney, Agent, or Firm*—Burns, Doane, Swecker and Mathis

[57] ABSTRACT

A compaction mill 10 comprises a rotary die plate 12 and a plurality of compaction rollers 14 spaced circumferentially along the inside of the die plate. Sprockets and chains provide a positive drive connection between the die plate 12 and the compaction rollers 14, ensuring that, in operation, there is substantially no relative slip between the outer peripheries of the rollers and the inner periphery of the die plate, where they are closest together. Guides 44 cooperating with sliding blocks 38, 40 constrain the rollers 14 against rotation about the axis of rotation of the die plate, whilst permitting guided displacement of the rollers in a radial direction with respect to said axis. Wedge members 46, 48, a screw threaded rod 50, and nuts 52 are provided to permit adjustment of the gap between the rollers and the die plate, and to make radial displacement of the individual rollers interdependent.

6 Claims, 7 Drawing Figures

COMPACTING MILL

FIELD OF THE INVENTION

This invention relates to a compacting mill for compacting particulate solids into briquettes, pellets, or the like. More particularly, it relates to a compacting mill of the kind comprising a die plate having die passages therethrough, and one or more compacting rollers which can be displaced relatively along the die plate, thereby to press material to be compacted into the die passages.

BACKGROUND OF THE INVENTION

Applicant is aware of a compacting mill of the kind referred to above, in which the die plate is cylindrical, in which the compacting rollers are mounted eccentrically on a rotary carrier inside the die plate, in which the rollers are freely and independently rotatable about their respective axes of rotation, and in which, during operation, the rollers are displaced along the inside surface of the die plate by applying drive to the carrier, thereby to rotate the carrier about its axis of rotation. Frictional engagement of the rollers with the material to be compacted between the rollers and the die plate then causes the rollers to rotate about their respective axes of rotation relative to the carrier.

Applicant has found that this arrangement leads to jamming of the rollers, whereupon they no longer roll over the surface of the plate but, instead, slide over it without rolling. This is not desirable and it is an object of the present invention to overcome or at least alleviate the problem.

SUMMARY OF THE INVENTION

According to the invention there is provided a compacting mill for compacting particulate solids into briquettes, pellets, or the like, and comprising: a stationary structure; a cylindrical die plate mounted on said structure, the die plate having an axis of symmetry (the first axis of symmetry) and having die passages extending through the die plate; and a compacting roller having an axis of symmetry (the second axis of symmetry), having an outside diameter which is smaller than the inside diameter of the die plate, and being relatively displaceable along the inside of the die plate, thereby to press material to be compacted into the die passages;

wherein the die plate is fast with a first drive transmission member co-axial with the die plate;

wherein the compacting roller is fast with a second drive transmission member co-axial with the roller; and wherein there is a positive drive connection between the die plate and the roller via said first and second drive transmission members.

Said drive connection is preferably such that the ratio between the speed of rotation of the roller and the speed of rotation of the die plate is equal to the inverse ratio between the outside diameter of the roller and the inside diameter of the die plate, whereby, in operation, there is substantially no relative tangential slip between the outer periphery of the roller and the inner periphery of the die plate, where the roller and the die plate are closest together.

There may be two or more of said rollers each having a said second axis of symmetry, the rollers being spaced circumferentially along the inside of the die plate;

the die plate may be mounted to be rotatable with respect to said structure about the first axis of symmetry;

each roller may be mounted to be rotatable with respect to a sliding block, about the respective second axis of symmetry; and each sliding block may be mounted on said structure so as to be displacable in a radial direction with respect to the first axis of symmetry whilst being constrained against circumferential displacement with respect to said structure about the first axis of symmetry.

Radially inwardly of the sliding blocks, there may be a laterally displaceable connecting member which abuts against each of the sliding blocks, thereby making radial displacement of the sliding blocks interdependent.

Said connecting member may comprise an axially adjustable wedge member arranged such that axial displacement of the wedge member with respect to the sliding blocks increases or decreases radial separation of the sliding blocks.

The second drive transmission member associated with each of the rollers may comprise a shaft and a first sprocket connected to the shaft, the first sprockets being drivingly interconnected by a first chain engaging with the first sprockets.

The first drive transmission member may comprise a second sprocket, said positive drive connection including a second chain engaging with the second sprocket.

BRIEF DESCRIPTION OF THE DRAWINGS

The invention will now be described in more detail, by way of example, with reference to the accompanying diagrammatic drawings.

In the drawings.

DETAILED DESCRIPTION OF PREFERRED EMBODIMENT

Figure 1:
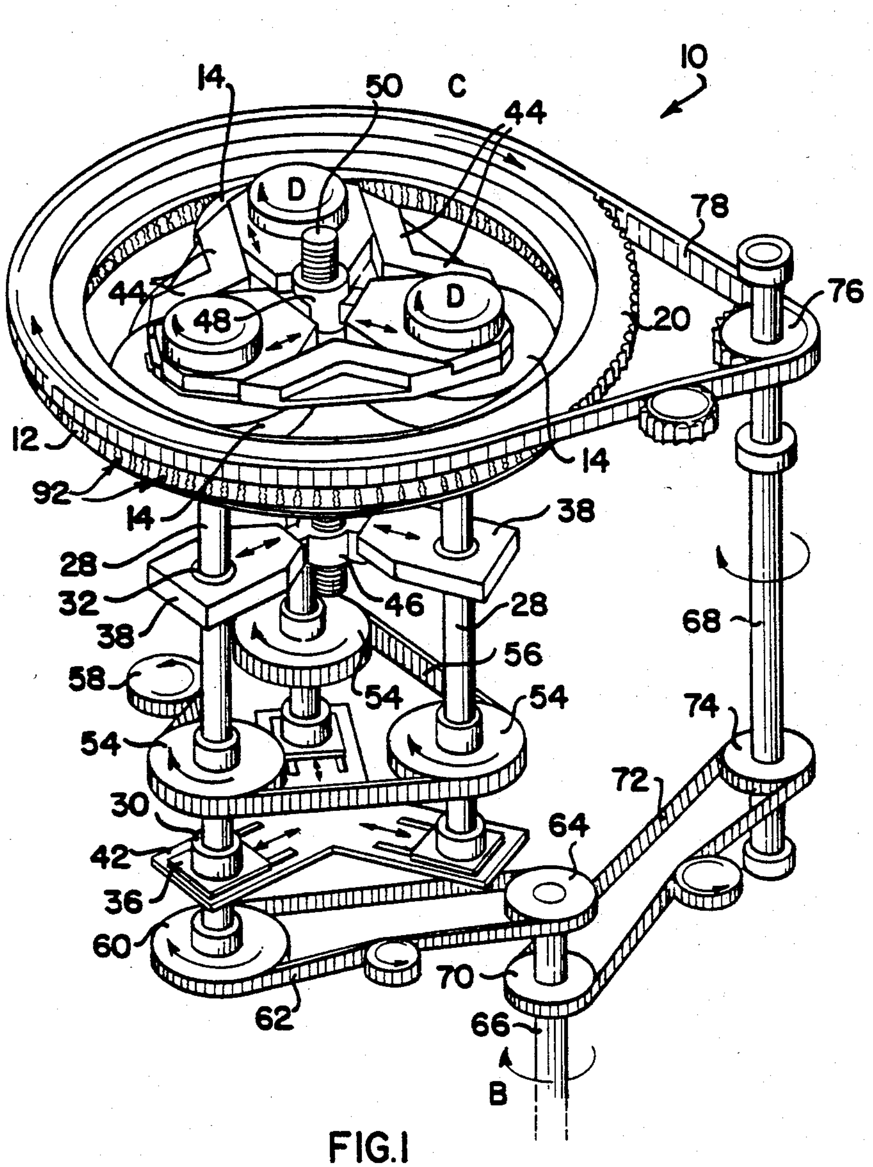
FIG. 1 is a three dimensional view of the working parts of a compacting mill in accordance with the invention.
Figure 2:
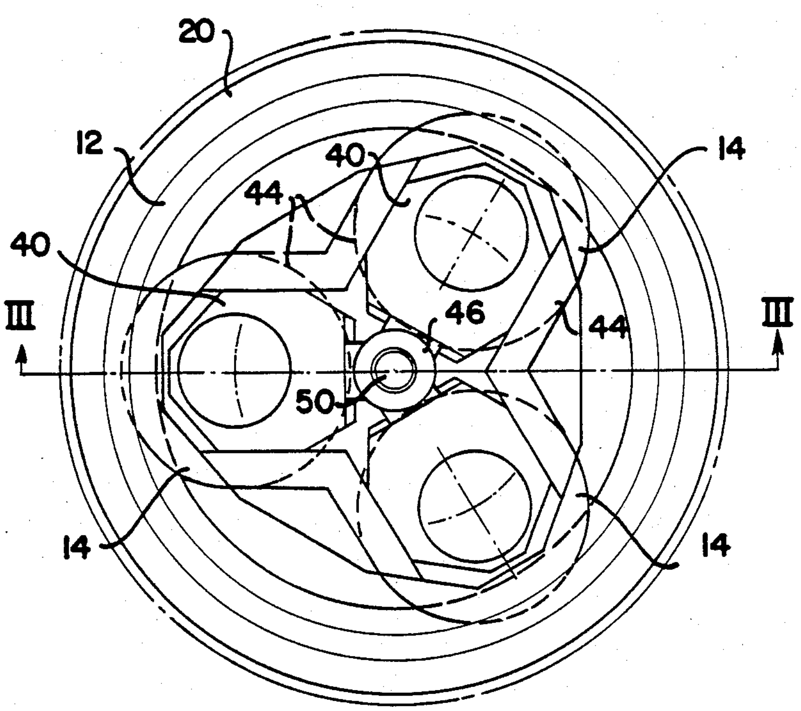
FIG. 2 is a top plan view showing the die plate and compacting rollers of the compacting mill.
Figure 3:
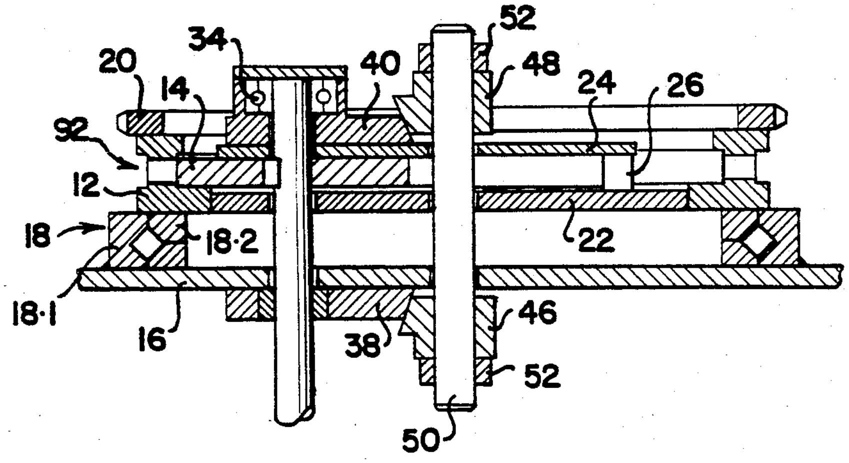
FIG. 3 is a vertical section, on line III—III in FIG. 2, of part of the compacting mill.

Referring first to FIGS. 1 to 3 of the drawings, reference numeral 10 generally indicates a compacting mill comprising a cylindrical die plate 12 and three circumferentially spaced compacting rollers 14 arranged inside the die plate.

The die plate 12 is mounted on a member 16 forming part of the stationary structure of the mill, via a roller bearing 18. The bearing 18 has an outer race 18.1 fast with the member 16, and an inner race 18.2 fast with the die plate 12. An annular sprocket 20 is secured to the die plate 12.

A bottom end plate 22 is secured to the member 16 via mountings (not shown), and a top end plate 24 is in turn secured to the bottom end plate, there being spacers 26 spacing the bottom and top end plates apart. There is a narrow annular gap between the bottom end plate 22 and the die plate 12, this gap being made as narrow as possible so as to reduce to a minimum the spillage of material through the gap during operation of the mill.

The compacting rollers 14 are accommodated in the space between the bottom and top end plates 22, 24, each roller 14 being secured to a shaft 28. Each shaft 28 passes through an over-size or slotted hole in the bottom and top end plates 22, 24 and in the member 16, and is mounted for rotation in three bearings, namely a lower bearing 30, an intermediate bearing 32, and an upper bearing 34. The lower bearing 30 is mounted in a mounting 36, the intermediate bearing 32 in a lower sliding block 38, and the upper bearing 34 in an upper sliding block 40.

The mountings 36 are mounted on a member 42 which forms part of the stationary structure of the mill, in such a manner that they are each individually adjustable in a radial direction. After adjustment, the mountings are tightened so that, during operation of the mill they are fixed in position.

The upper sliding blocks 40 are each slidable in a radial direction by virtue of guides 44 secured to the top end plate 24. Similarly, the lower sliding blocks 38 are each slidable in a radial direction by virtue of guides (not shown) secured to the member 16. The guides are effective to constrain circumferential displacement of the rollers 14 with respect to the stationary structure, about the axis of rotation of the die plate 12.

The radially inner face of each of the sliding blocks 38, 40 is inclined to the vertical. With the lower sliding blocks 38 there is associated a centrally arranged wedge member 46, and with the upper sliding blocks 40 a centrally arranged wedge member 48. Each wedge member 46, 48 has a central opening and three radially outwardly directed, inclined faces complementary to the inner faces of the corresponding sliding blocks 38, 40. A screw-threaded rod 50 passes through the central openings of the wedge members 46, 48, and is provided at each end with a nut 52. By tightening the nuts 52, the wedge members 46, 48 can be drawn together and this, through the complementary inclined faces, forces the sliding blocks 38, 40 radially outwardly, thus increasing their radial separation. The rod 50 passes through oversize openings in the bottom and top end plates 22, 24 and in the member 16, so that it is permitted a certain amount of lateral movement in all directions.

To each shaft 28 there is connected a sprocket 54, and the sprockets 54 are interconnected by a chain 56. A spring-biased idler sprocket 58 is provided to take up any slack in the chain 24 and to permit radial adjustment of the mountings 36.

There is a drive connection between the compacting rollers 14 and the die plate 12. This is effected as follows: One of the shafts 28 has a second sprocket 60 which, via a chain 62, is connected to a sprocket 64. The sprocket 64 is carried on a vertical drive shaft 66. The drive shaft 66 is connected to a vertical shaft 68 by a sprocket 70 carried on the shaft 66, a chain 72, and a sprocket 74 carried on the shaft 68. The shaft 68 is connected to the die plate 12 by a sprocket 76 carried on the shaft 68, and a chain 78 which runs from the sprocket 76 to the annular sprocket 20.

An electric motor (not shown) is provided to impart drive to the shaft 66. If the shaft 66 is driven in the direction of arrow B, then the die plate 12 will be driven in the direction of arrow C, and each of the compacting rollers 14 will be driven in the direction of arrows D. The various drive transmission ratios are selected such that the circumferential speed of the inner periphery of the die plate 12 is substantially the same as the circumferential speed of the outer periphery of the compacting rollers 14. Thus there will be no tangential slip between the rollers and the die plate, where they are closest together.

Figure 4:
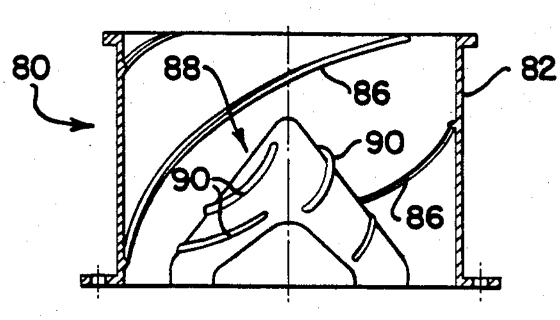
FIG. 4 is a vertical section through a feeder at the inlet of the mill.
Figure 5:
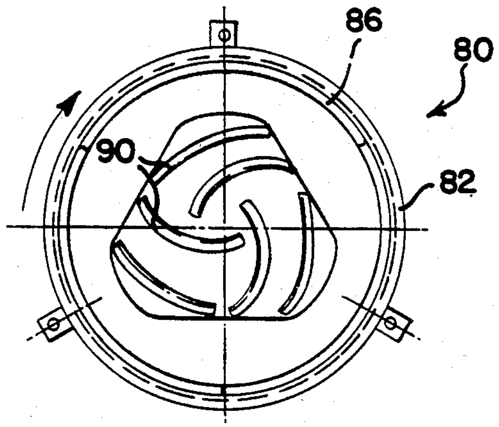
FIG. 5 is a top plan view of the feeder.

Above the die plate 12 there is a feeder 80 which is illustrated in FIGS. 4 and 5, to which reference will now be made.

The feeder 80 comprises an outer member 82 which is mounted on the die plate 12. It has a cylindrical inner surface which is provided with inwardly directed, helically extending blades 86. The outer member 82 is secured to the die plate 12. Within the outer member 82 there is an inner member 88, the inner member 88 having a generally conical outer surface which tapers down upwardly and is provided with outwardly directed, helically extending blades 90. The inner member 88 is supported on the top end plate 24 and is therefore stationary during operation of the mill.

Figure 6:
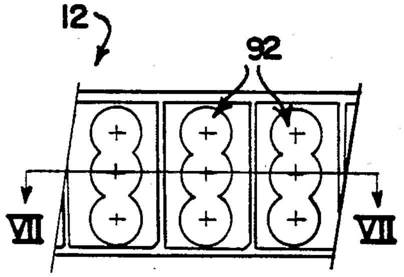
FIG. 6 shows the inside of part of the die plate, viewed in a radially outward direction.
Figure 7:
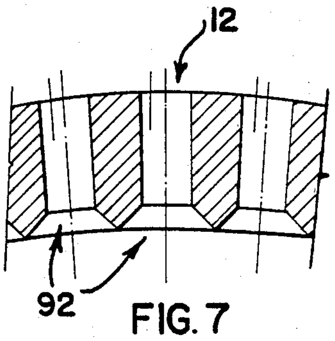
FIG. 7 is a section through the die plate, taken on line VII—VII in FIG. 6.

The die plate 12 is provided with a plurality of die passages 92 extending radially therethrough, the die passages being shown in more detail in FIGS. 6 and 7 to which reference will now be made. The cross-sectional shape of the die passages 92 is shown in FIG. 6. Each die passage 92 is provided by drilling a series of three holes radially through the die plate, the holes overlapping so as to form a single die passage having the undulating cross-sectional shape indicated in FIG. 6. The inside ends of the holes are reamed out so that inner end portions of the holes are tapered.

In operation, material to be compacted is charged into the space between the outer and inner members 82 and 88 respectively of the feeder 80, where the blades 86 and 90 will work the material down into the space inside the die plate 12. Here the compacting rollers 14 will press the material into the die passages 92 where the material is compacted and issues in the form of pellets or briquettes from the radially outer ends of the die passages.

The gap between the compacting rollers 14 and the die plates 12 can be adjusted by adjusting the nuts 52. By tightening the nuts, the gap is narrowed, whereas, by loosening the nuts, the gap is widened. In operation, by virtue of the slidable displaceability of the sliding blocks 38, 40, radial displacement of each individual compaction roller 14 can take place, provided that when, for example, one of the rollers is displaced radially inwardly, one or both of the other two rollers give way in a radially outward direction. In this way, radial displacement of the sliding blocks is interdependent.

We claim:

1. A compacting mill for compacting particulate solids into briquettes, pellets, or the like, and comprising: a stationary structure; a cylindrical die plate mounted on said structure, the die plate having an axis of symmetry (the first axis of symmetry) and having die passages extending through the die plate; and at least two circumferentially spaced compacting rollers each having an axis of symmetry (the respective second axis of symmetry), having an outside diameter which is smaller than the inside diameter of the die plate, and being relatively displaceable along the inside of the die plate, thereby to press material to be compacted into the die passages;

wherein the die plate is fast with a first drive transmission member co-axial with the die plate;

wherein the compacting roller is fast with a second drive transmission member co-axial with the roller;

wherein there is a positive drive connection between the die plate and the roller via said first and second drive transmission members;

wherein the rollers are spaced apart circumferentially by more than 90° and are mounted such that each said roller is, during operation of the mill, displaceable radially inwardly with respect to the first axis of symmetry by the pressure exerted by said material on the roller as the material is being pressed into the die passages; and wherein there is an interconnection between the rollers which is such that radially inward displacement of either one of the rollers is dependent on radially outward displacement of the other roller.

2. A compacting mill according to claim 1:

wherein the die plate is mounted to be rotatable with respect to said structure about the first axis of symmetry;

wherein each roller is mounted to be rotatable with respect to a sliding block, about the respective second axis of symmetry; and wherein each sliding block is mounted on said structure so as to be displaceable in a radial direction with respect to the first axis of symmetry whilst being constrained against circumferential displacement with respect to said structure about the first axis of symmetry.

3. A compacting mill according to claim 2, wherein said interconnection includes a radially displaceable connecting member which abuts radially outwardly against each of the sliding blocks.

4. A compacting mill according to claim 3, wherein said connecting member comprises an axially adjustable wedge member arranged such that axial displacement of the wedge member with respect to the sliding blocks increases or decreases radial separation of the sliding blocks.

5. A compacting mill according to claim 2, wherein the second drive transmission member associated with each of the rollers comprises a shaft and a first sprocket connected to the shaft, the first sprockets being drivingly interconnected by a first chain engaging with the first sprockets; wherein the first drive transmission member comprises a second sprocket; and wherein one of said shafts and said second sprocket are interconnected by a sprocket and chain drive connection.

6. A compacting mill according to claim 2, wherein the first axis of symmetry is upright, and wherein the die plate is supported rotatably on said structure by means of a bearing disposed radially outwardly of the second axes of symmetry.

* * * * *